L. L. KNOX.
WATER COOLED VALVE OR DAMPER STRUCTURE.
APPLICATION FILED DEC. 21, 1916.
1,256,330.
Patented Feb. 12, 1918.
3 SHEETS—SHEET 1.
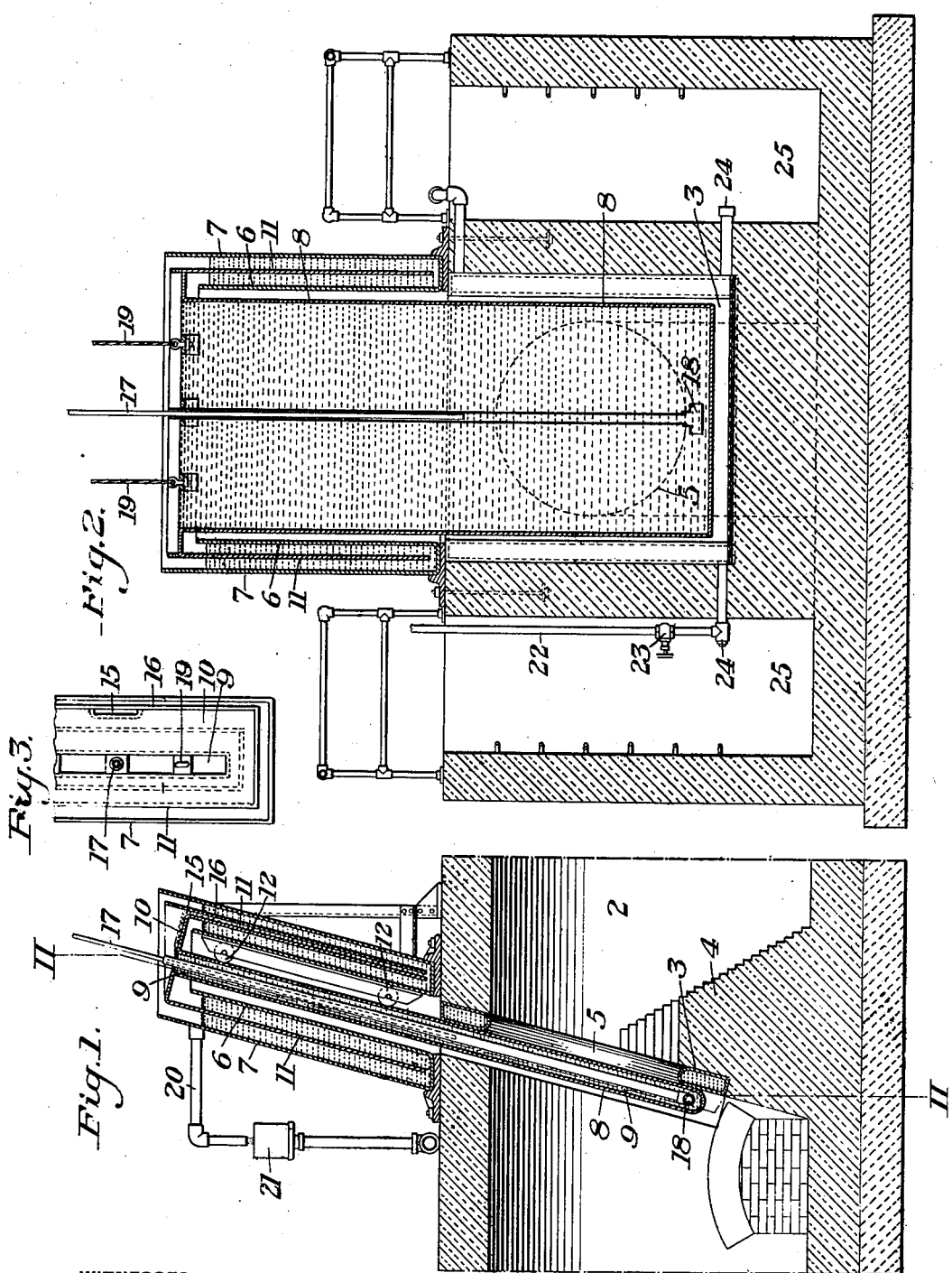
WITNESSES
INVENTOR

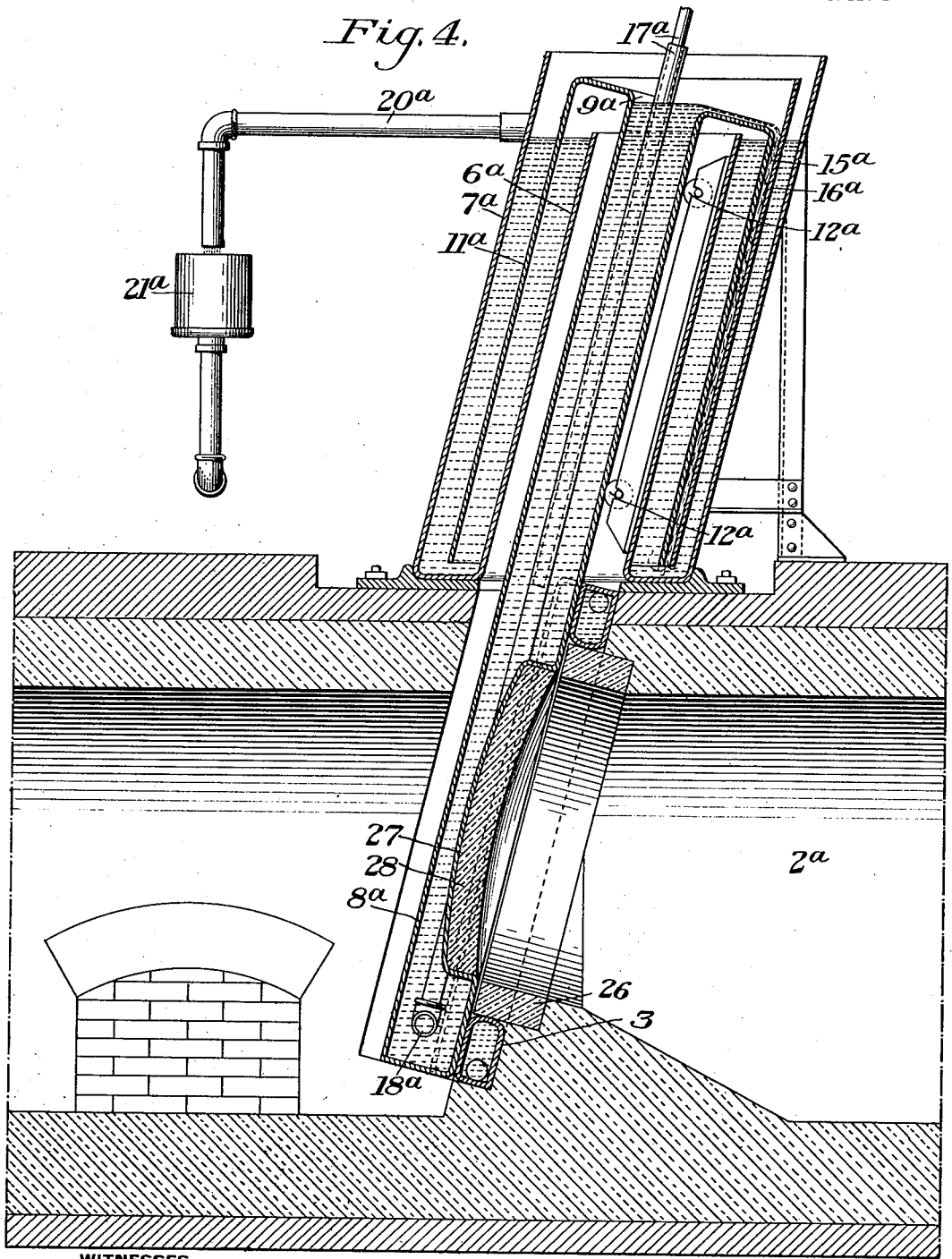
L. L. KNOX.
WATER COOLED VALVE OR DAMPER STRUCTURE.
APPLICATION FILED DEC. 21, 1916.
1,256,330.
Patented Feb. 12, 1918.
3 SHEETS—SHEET 2.

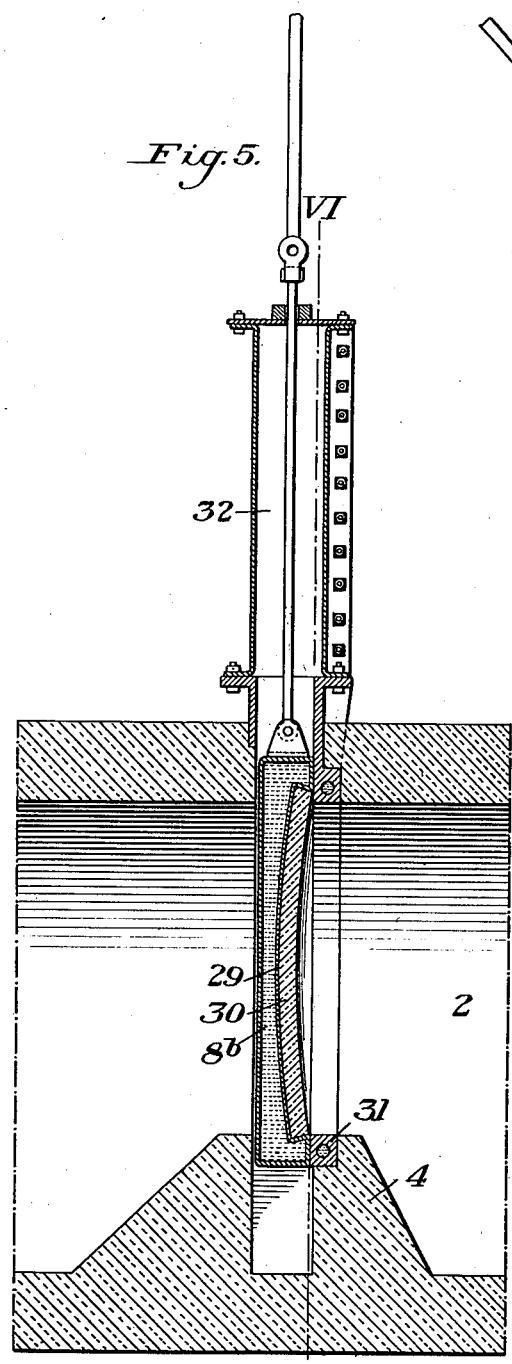
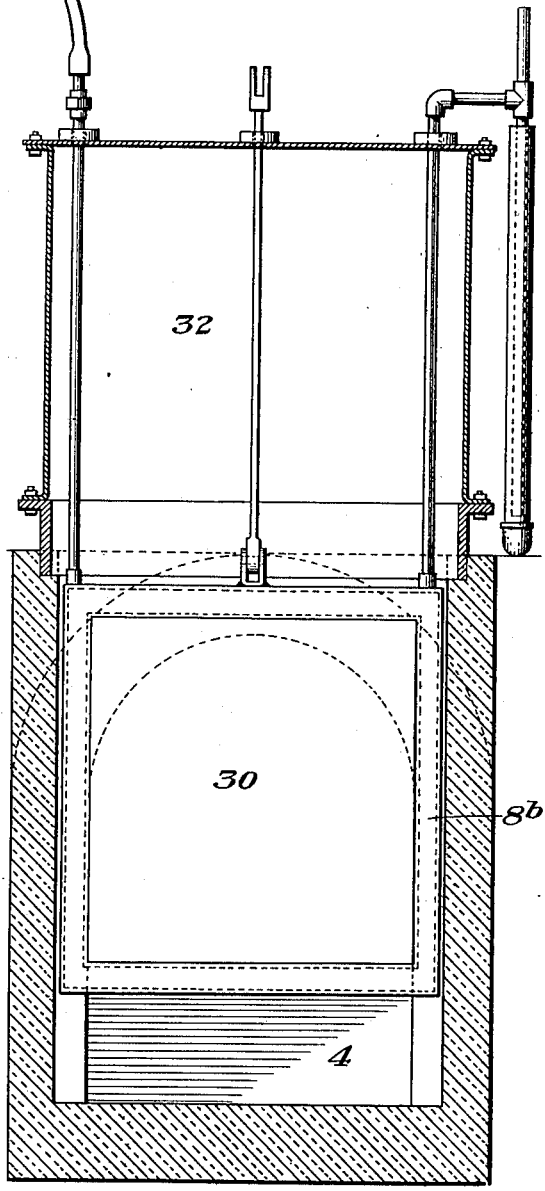

UNITED STATES PATENT OFFICE.

LUTHER L. KNOX, OF AVALON, PENNSYLVANIA, ASSIGNOR, BY MESNE ASSIGNMENTS, TO BLAW-KNOX COMPANY, OF PITTSBURGH, PENNSYLVANIA, A CORPORATION OF NEW JERSEY.

WATER-COOLED VALVE OR DAMPER STRUCTURE.

1,256,330.  Specification of Letters Patent.  Patented Feb. 12, 1918.

Application filed December 21, 1916. Serial No. 138,292.

*To all whom it may concern:*

Be it known that I, LUTHER L. KNOX, a citizen of the United States, residing at Avalon, Allegheny county, Pennsylvania, have invented a new and useful Improvement in Water-Cooled Valve or Damper Structures, of which the following is a full, clear, and exact description, reference being had to the accompanying drawings, forming part of this specification, in which—

Figure 1 is a vertical section of a portion of a flue structure and of a valve or damper arrangement embodying my invention;

Fig. 2 is a section on the line II—II of Fig. 1;

Fig. 3 is a partial top plan view of the valve or damper proper;

Fig. 4 is a view similar to Fig. 1. but on a larger scale and showing a modification; and Figs. 5 and 6 are sectional views taken at right angles to each other and showing a still further modification.

My invention has relation to water-cooled valve or damper structures, which are particularly designed for use in furnace or other flues where relatively high temperatures obtain.

The object of my invention is to provide a structure of this character which can be readily applied to a flue, which can be constructed largely from sheet metal, and which will provide in a novel manner for an effective circulation of cooling water both through the valve or damper itself and through its seating member.

A further object of my invention is to provide a novel construction of the valve or damper proper.

The nature of my invention will be best understood by reference to the accompanying drawings, in which I have shown several modifications of my invention and which will now be described, it being premised, however, that various changes can be made in the details of construction and arrangement of the several parts without departing from the spirit and scope of my invention as defined in the appended claims.

Referring to that form of my invention shown in Figs. 1, 2, and 3, the numeral 2 designates a portion of a flue structure; and 3 designates a valve or damper-seating member which is seated in the walls of the flue structure and is preferably supported at its lower end upon a raised transverse abutment 4 and the bottom wall of the flue. This frame is also preferably seated in an oblique position so as to obtain a gravity seating action of the valve or damper against its seating face. The seating member consists of a hollow water-cooled frame, preferably formed of sheet metal and having therethrough the flue opening 5.

Secured to the top wall of the flue is a water box or pan having substantially parallel inner and outer walls 6 and 7, the inner walls being sufficiently separated from each other to form an opening through which the upper portion of the valve or damper proper extends and through which it moves in opening and closing. 8 designates the valve or damper proper, which is also of hollow water-cooled form, its water space 9 being open or partially open at the upper end and its upper edges being flanged outwardly, as shown at 10, and then downwardly, as shown at 11, to form a water-sealing apron or skirt which telescopes within the water spaces between the inner and outer walls of the water box. One of the inner walls of said box is preferably provided with anti-friction rollers 12, against which the valve or damper rests and travels.

At one side, the depending flange 11 is inset to form a vertical water channel 15, which extends downwardly the full depth of said flange. The outer side of this water channel is closed (as best shown in Figs. 1 and 3) by the sheet or plate member 16, which is secured to the valve.

17 designates a water supply pipe formed in two telescopic sections and extending downwardly within the water space of the valve or damper to a point near the bottom of such space where it terminates in a suitable discharge head 18. 19 designates any suitable lifting connections for the valve.

The relatively cold water which is discharged within the lower portion of the water space of the valve rises and overflows through the opening at the top of said space, thence flows across the upper surface of one of the flanges 9, and thence downwardly through the water passage or channel 15, before described. In this manner, the overflow from the valve or damper preferably is carried down through the channel 15, and is discharged into the lower portion of the water space of the water box. The latter is provided at its upper portion with an overflow pipe 20. This pipe may be carried to any suitable point of discharge or it may be caused to discharge into the receptacle 21, thus giving opportunity for the flow of water to be observed in order to permit of the ready detection of stoppage from any cause.

The sealing flange or skirt 11 and the water box are of sufficient depth so that an efficient water seal is provided at all times, even when the valve or damper is fully open.

If desired, the seating member may be provided with an auxiliary water supply pipe 22, leading into its lower portion and provided with a controlling valve 23. 24 designates blow-out or clean-out plugs for said member. These plugs may extend into pits 25 at opposite sides of the flue structure for convenient access thereto.

In the form of my invention shown in Fig. 4, the general construction of the valve or damper and of the seating member is the same as in the form first described, and similar reference numerals have been applied thereto with the letter "a" affixed. In this modification, however, I have shown the water-cooled seating frame or member 2 as having a lining 26 of refractory material. I have also shown the lower portion of the water-cooled valve or damper as having an inset portion 27, at the side which faces the flow of hot gases, this inset being filled with a refractory body 28.

In Figs. 5 and 6, I have shown another form of the water-cooled valve or damper having an inset portion 29, with a refractory filling or lining 30. In the form shown in these figures, the valve or damper moves in a vertical plane instead of obliquely, the seating member 31 is of cast metal instead of sheet metal, and instead of providing the water-circulating and sealing arrangement of the forms just described, the valve works within a closed sealing chamber 32, mounted on a flue structure.

My invention provides a highly efficient damper or valve construction for furnace and other heating flues. The construction is a simple and comparatively inexpensive one, since it is largely made from sheet metal plates preferably welded at the joints. The water circulation is carried out in a highly efficient manner.

I claim:

1. In a valve or damper structure for furnaces, the combination with a hollow water-cooled valve or damper member having a portion which in the closed position of the valve or damper extends through and above the upper wall of the flue structure, said extending portion having a depending water-sealing flange or skirt, an open-top sealing box mounted on the flue structure and into the water spaces of which the said flange or skirt extends, said flange or skirt having a vertical water passage or channel formed therein and there being a connection between the water space of the valve or damper and said channel, substantially as described.

2. In a valve or damper structure for flues, the combination with a hollow water-cooled valve or damper having a portion projecting through and above the top wall of the flue structure, said projecting portion having a surrounding depending sealing flange or skirt, an open-top water box mounted on the top of the flue structure and having inner and outer walls at each side of the valve or damper with water spaces between such walls into which the said flange or skirt depends, said flange or skirt having a water passage or channel extending downwardly to the lower edge thereof and there being a connection between the water space of the valve or damper and the said channel, substantially as described.

3. In a valve or damper structure for furnaces, the combination with a hollow water-cooled valve or damper member having a portion which in the closed position of the valve or damper extends through and above the upper wall of the flue structure, said extending portion having a depending water-sealing flange or skirt, and an open-top sealing box mounted on the flue structure and into the water spaces of which the said flange or skirt extends, said flange or skirt having a vertical water passage or channel formed therein and there being a connection between the water space of the valve or damper and said channel, together with means for supplying cooling water to the interior of the valve or damper, substantially as described.

4. A flue valve or damper of hollow sheet metal form, the seating portion of said valve having an inset portion surrounded at the back and at its peripheral edges by the water space of the hollow structure, and a refractory lining or filler seated in said inset portion, the valve or damper having a flat seating metallic face around the said lining or filler; substantially as described.

5. A flue valve or damper of hollow sheet metal form, the seating portion of said valve having an inset portion surrounded at the back and at its peripheral edges by the water space of the hollow structure, and a refractory lining or filler seated in said inset portion, said lining or filler being of arched form and retained in said offset by its arched engagement therewith; substantially as described.

In testimony whereof, I have hereunto set my hand.

LUTHER L. KNOX.

Witnesses:
GEO. H. PARMELEE,
H. M. CORWIN.